(12) United States Patent
Watanabe et al.

(10) Patent No.: US 8,273,394 B2
(45) Date of Patent: Sep. 25, 2012

(54) DRIED EGG WHITE, PRODUCTION METHOD THEREFOR, AND FOOD CONTAINING IMPROVED DRIED EGG WHITE

(75) Inventors: Takayuki Watanabe, Tokyo (JP); Ryo Sasahara, Tokyo (JP); Toshiharu Tanaka, Kanagawa (JP); Hideaki Kobayashi, Tokyo (JP); Minori Kayanuma, Tokyo (JP); Kayo Sugiura, Tokyo (JP); Nanako Abe, Tokyo (JP); Kazuyuki Inoue, Tokyo (JP); Ryoji Tanaka, Tokyo (JP)

(73) Assignee: Q.P. Corporation (JP)

( * ) Notice: Subject to any disclaimer, the term of this patent is extended or adjusted under 35 U.S.C. 154(b) by 0 days.

(21) Appl. No.: 13/188,812

(22) Filed: Jul. 22, 2011

(65) Prior Publication Data

US 2011/0274798 A1 Nov. 10, 2011

Related U.S. Application Data

(62) Division of application No. 11/850,895, filed on Sep. 6, 2007, now abandoned.

(30) Foreign Application Priority Data

Sep. 7, 2006 (JP) ................................. 2006-242713
May 29, 2007 (JP) ................................. 2007-141394

(51) Int. Cl.
*A23L 1/32* (2006.01)
(52) U.S. Cl. ...................... 426/330.1; 426/614; 426/465
(58) Field of Classification Search ............... 426/330.1, 426/614
See application file for complete search history.

(56) References Cited

U.S. PATENT DOCUMENTS 3,216,828 A 11/1965 Koonz et al.

FOREIGN PATENT DOCUMENTS

| BE | 843067 A1 | 10/1976 |
|---|---|---|
| JP | B-3244586 | 10/1995 |
| JP | 09-084556 | 3/1997 |
| JP | B-2820385 | 3/1997 |
| JP | A-11-266836 | 10/1999 |

OTHER PUBLICATIONS

JP 09084556, Yoshiharu Kimura et al. Sep. 27, 1995. English Translation. pp. 1-18.*
Woodward S.A., et al., "Texture and microstructure of heat-formed egg white gels." Journal of Food Science, vol. 51, No. 2, 1986, p. 333, XP002496558.
Mine, Y., "Effect of pH during the dry heating on the gelling properties of egg white proteins", Food Research International, vol. 29, No. 2, 1996, p. 155, XP002496559.

* cited by examiner

*Primary Examiner* — Kelly Bekker
*Assistant Examiner* — Hong T Yoo
(74) *Attorney, Agent, or Firm* — Harness, Dickey & Pierce, P.L.C.

(57) ABSTRACT

A method for producing an improved dried egg white includes preparing a dried egg white by drying a liquid egg white so that the dried egg white after drying has a pH of 9 or more, and dissipating carbon dioxide contained in the dried egg white, wherein, by dissipating carbon dioxide contained in the dried egg white, the pH of the dried egg white is increased to 0.01 to 1 to obtain a pH of 9.5 or more and carbon dioxide concentration in a sealed 250 ml vial is decreased to 1% or less, when 25 g of the improved dried egg white is stored in the vial at 75° C. for 24 hours.

6 Claims, No Drawings

US 8,273,394 B2

DRIED EGG WHITE, PRODUCTION METHOD THEREFOR, AND FOOD CONTAINING IMPROVED DRIED EGG WHITE

CROSS REFERENCE TO RELATED APPLICATIONS

This is a Divisional Application of U.S. Ser. No. 11/850,895 filed Sep. 6, 2007, which claims priority to Japanese Patent Application No. 2006-242713, filed Sep. 7, 2006 and Japanese Patent Application No. 2007-141394, filed May 29, 2007. All of the above applications are hereby expressly incorporated by reference herein in their entirety.

BACKGROUND OF THE INVENTION

The present invention relates to an improved dried egg white which exhibits improved water retention, gel strength, elasticity, and the like after reconstitution and heat coagulation, while imparting excellent quality-improvement effects when used in various foods without adversely affecting the flavor and the like of the foods, to a method for producing the improved dried egg white, and to foods containing the improved dried egg white.

Since dried egg whites can be preserved for a long period of time, and require only low transport cost and a small shelf space as compared with raw egg whites, the dried egg whites are used as ingredients of various foods. In order to prevent quality deterioration such as browning and giving off an unpleasant odor during storage due to the Maillard reaction which occurs between the amino groups in egg proteins and glucose in egg white during preservation, the dried egg whites are prepared by desugaring liquid egg whites and drying the desugared egg whites by various methods such as spray drying, pan drying, freeze drying, and vacuum drying. Desugaring is typically carried out using yeasts, enzymes, bacteria, and the like. Since an appropriate range of pH during the desugaring treatment is weakly acidic to neutral, the pH is typically adjusted during desugaring by the addition of an acid agent such as citric acid. The resulting egg whites thus typically have an approximately neutral pH.

Dried egg whites are used not only as egg white ingredients, but also as quality-improving agents for improving the yield and texture of various processed foods such as processed meat products, processed seafood products, and noodles. Heat-coagulated products (gels) produced by coagulating dried egg whites by heating to be used for these applications are desired to exhibit high water retention, high gel strength, elasticity, and the like. For this reason, dried egg whites with improved properties such as water retention, gel strength, and elasticity have heretofore been proposed.

Japanese Patent No. 3244586, for example, proposes a dried egg white with improved elasticity obtained by adding a fatty acid. However, the dried egg white obtained using this technique may have an unpleasant taste and odor due to the fatty acid.

JP-A-11-266836 proposes a dried egg white with improved water retention obtained by adjusting the pH of a liquid egg white to 9.3 or more by the addition of an alkali salt such as sodium carbonate, maintaining the egg white at this pH for 10 minutes, and by drying the egg white. With this technique, however, because the alkali salt added remains in the final product, the addition of the resulting dried egg white to a food may adversely affect the taste or physical properties of the food.

SUMMARY

The invention may provide an improved dried egg white which exhibits excellently improved water retention, gel strength, elasticity, and the like after reconstitution and heat coagulation without the use of an additive, a method for producing the improved dried egg white, and foods containing the improved dried egg white.

The invention may further provide an improved dried egg white which is free of additives, and thus exhibits excellent quality-improvement effects when used in various foods without adversely affecting the flavor and the like of the foods, and a method for producing the improved dried egg white.

It is known that liquid egg whites from hen eggs contain carbon dioxide dissolved therein. It is also known that in a typical method of producing dried egg whites which comprises desugaring liquid egg whites and drying the desugared egg whites, the pH of a solution of egg white prepared by reconstituting the dried egg white in water shows a tendency to be higher than the pH of the liquid egg white before drying. The reason for this tendency has been considered to be the result of discharge of the dissolved carbon dioxide from the egg white during the drying operation, which leaves almost no carbon dioxide in the resulting dried egg white.

Under these circumstances, the inventors have found that dried egg whites with a pH of 9 or more, prepared by adding no organic acid or adding only a small amount of organic acid during desugaring, contain a certain amount of carbon dioxide, and in addition, the carbon dioxide contained in these dried egg whites can be dissipated by a suitable dry-heat treatment. The dried egg whites with an increased pH obtained by dissipating carbon dioxide can hardly become denatured, even when subjected to a dry-heat treatment, while exhibiting sufficiently improved water retention, gel strength and elasticity over the dried egg whites of which the pH has been increased by adding an alkali salt. In addition, this method provides dried egg whites which exhibit excellent quality-improvement effects when used in various foods without adversely affecting the flavor and the like, as compared with a common method of improving the water retention by adding an additive such as an alkali salt or fatty acid. These findings have led to the completion of an improved dried egg white and a method for producing the same according to this invention.

An improved dried egg white according to one aspect of the invention has a pH of 9.5 or more and a carbon dioxide concentration is 1% or less in a sealed 250 ml vial, when 25 g of the product is stored in the vial at 75° C. for 24 hours. In the invention, the term "product" refers to the improved dried egg white.

A heat-coagulated product obtained by adding 7 parts by mass of water to 1 part by mass of the improved dried egg white and coagulating the resulting solution by heating may have a water separation rate of 3% or less.

The heat-coagulated product obtained by adding 7 parts by mass of water to 1 part by mass of the improved dried egg white and coagulating the resulting solution by heating may have a gel strength of 400 g or more.

The heat-coagulated product obtained by adding 7 parts by mass of water to 1 part by mass of the improved dried egg white and coagulating the resulting solution by heating may have a compression distance of 10 mm or more.

A food according to one aspect of the invention comprises the improved dried egg white.

A frozen food according to one aspect of the invention comprises the improved dried egg white.

A processed meat product according to one aspect of the invention comprises the improved dried egg white.

A processed seafood product according to one aspect of the invention comprises the improved dried egg white.

A noodle according to one aspect of the invention comprises the improved dried egg white.

A processed egg product according to one aspect of the invention comprises the improved dried egg white.

A method for producing an improved dried egg white according to one aspect of the invention comprises preparing a dried egg white by drying a liquid egg white so that the pH of the egg white after drying is 9 or more, and dissipating carbon dioxide contained in the dried egg white.

The expression "dissipating carbon dioxide" as used herein means discharging carbon dioxide into the atmosphere, and then removing the carbon dioxide.

In the above method, dissipating carbon dioxide contained in the dried egg white may increase the pH of the dried egg white.

In the above method, dissipating carbon dioxide in the dried egg white may comprise subjecting the dried egg white to a dry-heat treatment while removing the carbon dioxide discharged into the atmosphere from the dried egg white. In this case, the temperature of the dry-heat treatment may be from 45 to 120° C. The dry-heat treatment may be carried out while removing the carbon dioxide discharged from the dried egg white by ventilation. In addition, the dry-heat treatment may be carried out while causing the carbon dioxide discharged from the dried egg white to be absorbed in a carbon dioxide absorber. The dry-heat treatment may be carried out for one or more days under conditions in which the water content of the dried egg white is 4% or more.

In the above method, dissipating carbon dioxide contained in the dried egg white may decrease the concentration of carbon dioxide in a sealed 250 ml vial to 1% or less, when 25 g of the improved dried egg white is stored in the vial at 75° C. for 24 hours.

In the above method, dissipating carbon dioxide contained in the dried egg white may increase the pH of the dried egg white to 9.5 or more.

The improved dried egg white exhibits improved water retention, gel strength, elasticity and the like after reconstitution and heat coagulation without the use of an additive. Moreover, the improved dried egg white does not contain an additive, and therefore imparts excellent quality-improvement effects when used in various processed foods without adversely affecting the flavor and the like. Hence, demand for such processed foods can be expanded.

DETAILED DESCRIPTION OF THE EMBODIMENT

The improved dried egg white according to one embodiment of the invention, the method for producing the improved dried egg white, and the foods containing the improved dried egg white will be described below. In the embodiment, "%" denotes "% by mass", and "part(s)" denote "part(s) by mass".

1. Improved Dried Egg White

The improved dried egg white according to this embodiment has a pH of 9.5 or more and a carbon dioxide concentration is 1% or less in a sealed 250 ml vial, when 25 g of the product is stored in the vial at 75° C. for 24 hours.

The carbon dioxide concentration in the vial after storing 25 g of the product in a sealed 250 ml vial at 75° C. for 24 hours represents the amount of carbon dioxide contained in the improved dried egg white according to the embodiment. This means that the higher the concentration of carbon dioxide in the vial, the larger the amount of carbon dioxide contained in the improved dried egg white.

More specifically, the carbon dioxide concentration in the vial is measured as follows: 25 g of the product is stored in a sealed 250 ml vial in a thermostatic chamber at 75° C. for 24 hours. The vial is then removed from the thermostatic chamber, and the carbon dioxide concentration in the vial is measured using a carbon dioxide analyzer (Check Point $O_2/CO_2$ manufactured by PBI-Dansensor) within one minute after the vial has been removed from the thermostatic chamber.

As will be described in the Examples described later, it is possible to sufficiently discharge carbon dioxide from the improved dried egg white by putting 25 g of the product in a sealed 250 ml vial and storing it therein at 75° C. for 24 hours. In other words, the concentration of carbon dioxide in a 250 ml vial after 25 g of the product is sealed and stored therein at 75° C. for 24 hours is almost the same as the carbon dioxide concentration substantially measured after the product is stored for more than 24 hours under the same conditions.

The term "dried egg white" as used herein refers to an egg white obtained by drying a liquid egg white by various methods such as spray drying, pan drying, freeze drying, and vacuum drying. The term "pH of the (improved) dried egg white" as used herein refers to the pH value of a solution in which the (improved) dried egg white is dissolved by adding 7 parts by mass of water to 1 part by mass of the (improved) dried egg white, measured using a pH meter (MP 225 manufactured by Mettler Toledo).

The improved dried egg white according to the embodiment has a high water retention while exhibiting improved gel strength, elasticity, and the like due to the 9.5 or higher pH and the carbon dioxide concentration in the vial of not more than 1%. That is, the improved dried egg white has a carbon dioxide concentration in the vial of 1% or less, thus exhibiting a low carbon dioxide content, and accordingly a pH of 9.5 or more. Therefore, the improved dried egg white has excellent water retention, and also exhibits excellent gel strength and elasticity can hardly become denatured, even when subjected to a dry-heat treatment, as compared with the case of increasing the pH by adding an alkali salt.

Furthermore, since the improved dried egg white absorbs carbon dioxide only with difficulty even when stored in the atmosphere at room temperature, the pH is not lowered by absorption of carbon dioxide, whereby a decrease of water retention and gel strength, or loss of elasticity can be prevented.

The pH of the improved dried egg white is preferably in a range of 9.5 to 10.9. Since the improved dried egg white does not contain an alkaline agent or contains only a small amount of alkaline agent, it has a pH of 10.9 or less even when subjected to a dry-heat treatment while removing carbon dioxide as described later. Note that from the viewpoint of mass production in the food industry, in order to accomplish stable production of dried egg whites with a pH raised to the aforementioned range, it is necessary to finely adjust the dry-heat conditions described later so as to prevent the dried egg whites from becoming denatured. This involves expensive manufacturing costs and is not economical. Therefore, the improved dried egg white preferably has a pH of 10.7 or less. In addition, in order to ensure the quality-improvement effects of the improved dried egg white, the pH is preferably 9.5 or more, more preferably 10 or more, and still more preferably 10.2 or more.

1.1. Water Retention

The improved dried egg white according to the embodiment has high water retention, under the carbon dioxide concentration of 1% or less, and preferably 0.8% or less in a sealed 250 ml vial, after 25 g of the product is stored in the vial at 75° C. for 24 hours.

The "water retention" can be evaluated based on the water separation rate measured by the method described below. The term "water separation rate" as used herein refers to the proportion of water separated from a heat-coagulated product obtained by adding 7 parts by mass of water to 1 part by mass of the dried egg white, and coagulating the resulting solution by heating. The lower the value of the water separation rate, the higher the water retention.

Specifically, the improved dried egg white according to the embodiment preferably has a water separation rate of 3% or less, more preferably 2.7% or less, and still more preferably 2.5% or less.

The water separation rate is a value measured by the following method which comprises:

(a) dissolving 1 part by mass of the dried egg white in 7 parts by mass of water, filling the resulting solution into a nylon container with a folding diameter of 60 mm, and heating the content at 80° C. for 40 minutes to prepare a heat-coagulated product, (b) storing the heat-coagulated product at 5° C. for 24 hours, (c) allowing the heat-coagulated product after storage to stand at room temperature (20° C.) for 3 hours so as to increase the temperature of the product to 20° C., (d) removing the heat-coagulated product from the container and cutting it at right angles to the longitudinal direction into pieces with a thickness of 3 cm, and (e) placing the cut piece of the heat-coagulated product on five layers of filter paper (qualitative filter paper No. 2) with a diameter of 110 mm, either one of the cut surfaces being the bottom, and allowing it to stand at room temperature for 1 hour. The water separation rate is calculated by applying the following formula to the mass change in the heat-coagulated product before and after standing.

Water separation rate(%) ={(mass of heat-coagulated product before standing−mass of heat-coagulated product after standing)/mass of heat-coagulated product before standing}×100

The improved dried egg white according to the embodiment provides sufficiently improved gel strength and elasticity due to the dry-heat treatment of the dried egg white, preferably after adjusting the water content.

1.2. Gel Strength

The property "gel strength" of the heat-coagulated product of a dried egg white referred to herein is a value showing the hardness of a heat-coagulated product obtained by adding 7 parts by mass of water to 1 part by mass of the dried egg white, and coagulating the resulting solution by heating. The higher the gel strength, the higher the hardness.

The gel strength can be evaluated in the following manner. The gel strength is a value of the gel strength of a cut piece of a heat-coagulated product prepared according to the method of (a) to (d) described above, measured using FUDOH RHEO METER NRM-2010J-CW (manufactured by Rheotech). More specifically, the gel strength is a value measured placing the cut piece of the heat-coagulated product on a measurement table, with either one of the cut surfaces being the bottom, and measuring the gel strength (breaking strength) using an 8 mm phi spherical plunger at a table elevation speed of 6 cm/min.

Specifically, the improved dried egg white according to the embodiment preferably has a gel strength of 400 g or more, more preferably 420 g or more, and still more preferably 440 g or more.

1.3. Elasticity

Elasticity can be evaluated based on the compression distance measured in the following manner. The compression distance is a value showing the elasticity of a heat-coagulated product obtained by adding 7 parts by mass of water to 1 part by mass of the dried egg white, and coagulating the resulting solution by heating. Specifically, the compression distance is a value of the degree of compression of a cut piece of the heat-coagulated product prepared according to the above-described method of (a) to (d), measured using FUDOH RHEO METER NRM-2010J-CW (manufactured by Rheotech). That is, the compression distance is a value measured by placing a cut piece of the heat-coagulated product on a measurement table, with either one of the cut surfaces being the bottom, and measuring the distance that the plunger has moved from the point of contact with the gel surface to the point of breaking the gel using an 8 mm phi spherical plunger at a table elevation speed of 6 cm/min. The greater the compression distance, the higher the elasticity.

The improved dried egg white according to the embodiment preferably has a compression distance of 10 mm or more, more preferably 12 mm or more, and still more preferably 13 mm or more.

Due to improvements in water retention, gel strength, elasticity and the like without the use of an additive, the improved dried egg white of the embodiment exhibits excellent quality-improvement effects when used in various foods without adversely affecting the flavor and the like. More specifically, the high water retention properties of the improved dried egg white of the embodiment can not only ensure an increased yield of various foodstuffs by preventing separation of water, but also can prevent deterioration in the properties of these foodstuffs when frozen. Moreover, the high gel strength and elasticity of the improved dried egg white of the embodiment can ensure an improved texture to these foodstuffs.

Examples of foods in which the improved dried egg white can be used include processed meat products such as hams, sausages, and shumai (steam dumplings); processed seafood products such as kamaboko (surimi or surimi seafoods), chikuwa (a Japanese tube-like food product similar to surimi or surimi seafoods), and fish-meat sausages; noodles such as Chinese noodles, udon (Japanese wheat-based noodles), and buckwheat noodles; processed egg products such as custard cream, egg salads, scrambled eggs, omelets, chawan-mushi (a Japanese egg custard dish), and puddings; acidic oil-in-water emulsified foods (pH: 3 to 4.5) such as mayonnaise and tartar sauce; sauces such as carbonara sauce and corn soup; baked sweets such as cakes and cookies; breads, flour pastes, okonomiyaki (a pan fried Japanese dish), and takoyaki (Japanese octopus dumplings). Additional examples include the frozen form of these foods and frozen deserts such as ice creams and soft ice creams.

The amount of the improved dried egg white added to a food should be suitably selected according to the type of the food, but is, in general, preferably from 0.01 to 10%, and preferably from 0.05 to 5%, of the food. The addition of a smaller amount of the improved dried egg white makes it difficult to achieve the above-described effects provided by the addition of the improved dried egg white according to the invention. On the other hand, the addition of a larger amount does not bring the effect proportionate to the increased amount, and is thus uneconomical.

The improved dried egg white according to the embodiment can be prepared according to a method as described below.

2. Method for Producing Improved Dried Egg White

A method for producing an improved dried egg white according to one embodiment of the invention comprises preparing a dried egg white by drying a liquid egg white so that the pH of the egg white after drying is 9 or more, and dissipating carbon dioxide contained in the dried egg white. The method for producing the improved dried egg white will now be described.

2.1. Step of Preparing Dried Egg White

A liquid egg white is first prepared in order to prepare the improved dried egg white according to this embodiment. As examples of the liquid egg white, a raw liquid egg white obtained by cracking eggs and separating egg yolk, a liquid egg white obtained by treating the raw liquid egg white by means of filtration, sterilization, freezing, concentration, or the like, and a processed liquid egg white obtained by processing the liquid egg white to remove certain components therefrom, for example, a desugaring process to remove sugars and a lysozyme-removing process, can be given. Among these liquid egg whites, the desugared liquid egg white is preferable because of its capability of preventing quality deterioration such as browning and giving off an unpleasant odor due to the Maillard reaction which occurs between the amino groups in egg proteins and glucose in egg white during the dry-heat treatment which is described later. The desugaring process can be carried out according to a common method in which yeasts, enzymes, bacteria, or the like are used. In particular, a process using an yeast to decrease a free sugar content in the liquid egg white to 0.1% or less is preferable in view of the minimal chance of producing non-volatile acids and the capability of easily adjusting the pH of the resulting dried egg white at a high region.

Next, the liquid egg white is dried. In the method for producing the improved dried egg white of this embodiment, the pH of the egg white after a drying treatment is 9 or more, preferably 9.5 or more, and more preferably 10 or more.

Generally, when a liquid egg white is desugared using an yeast, an enzyme, or the like, the pH of the liquid egg white is adjusted to around neutral with the addition of an acidic agent such as an organic acid because the optimum pH of these yeasts and enzymes is weakly acidic to neutral. Accordingly, the resulting dried egg white has a pH around 7.

On the other hand, in the method of producing of the improved dried egg white of this embodiment, it is preferable that the dried egg white be adjusted to the above-mentioned specific pH range by adding no acidic agent such as an organic acid or adding only a small amount of such an acidic agent during the desugaring process. Although the specific pH range varies according to the pH of the liquid egg white, the type of drying treatment, and the like, a dried egg white with a pH in a range of about 9.9 to 10.1 can be obtained when a liquid egg white is desugared with an yeast without adding an acidic agent such as an organic acid. The higher the pH of the dried egg white obtained after a drying treatment, the higher the effect of improvement. Therefore, it is preferable to avoid the addition of an acidic agent such as an organic acid. When an organic acid such as citric acid is added as an acidic agent in order to increase the efficiency of the desugaring process, the amount of the organic acid used per 1 kg of the liquid egg white is preferably 1,000 mg or less, more preferably 500 mg or less, still more preferably 200 mg or less, and particularly preferably 100 mg or less.

The pH of a liquid egg white tends to be slightly higher after drying as compared with the pH before drying. Although such a pH increase varies according to the drying conditions, the pH increases about 1 to 3 when the liquid egg white is dried under typical spray drying conditions using a hot air of 150 to 200° C. This should be taken into account in determining the pH range of the dried egg white after the drying treatment.

In the method for producing the improved dried egg white of this embodiment, a small amount of alkaline compounds such as trisodium phosphate may be added in order to adjust the pH of the dried egg white in the above range. An alkaline compound, however, may adversely affect the flavor and properties of foods. In addition, proteins contained in such a dried egg white may be thermally denatured and insolubilized by a salt originating from an alkaline agent during the dry-hot treatment which is discussed later. Therefore, the amount of an alkaline agent that can be added in the method for producing the improved dried egg white of this embodiment is preferably 300 mg or less, more preferably 150 mg or less, and still more preferably 50 mg or less, per 1 kg of the liquid egg white.

There are no specific limitations to the drying method. Various common methods such as spray drying, pan drying, freeze drying, and vacuum drying can be employed.

The dried egg white obtained by the drying treatment with a pH of 9 or more as mentioned above has a high carbon dioxide content, whereas a dried egg white having a pH of less than the above-mentioned range has a low carbon dioxide content. The reason for this is considered to be that a dried egg white with a pH of about 7 obtained by desugaring with the addition of an acidic agent such as an organic acid easily discharges carbon dioxide dissolved therein during the dry-heat treatment and, as a result, contains almost no carbon dioxide.

According to the method for producing the improved dried egg white of this embodiment, a dried egg white obtained by a drying treatment designed to make a dried egg white with a pH of 9 or more is subjected the later-described dry-heat treatment, whereby carbon dioxide is dissipated to increase the pH and, at the same time, water-retention and other properties can be improved. On the other hand, since a dried egg white with a pH of about 7 dissipates almost no carbon dioxide even if it is heated, it is difficult to apply the production method of this embodiment which improves properties such as water retention by causing the dried egg white to dissipate carbon dioxide by a dry-heat treatment.

2.2. Step of Dissipating Carbon Dioxide

The method for producing an improved dried egg white according to this embodiment includes a step of dissipating carbon dioxide from the dried egg white obtained by the above-mentioned step of producing dried egg white. It is possible to increase the pH of the dried egg white, preferably to 9.5 or more, during the step of dissipating carbon dioxide from the dried egg white. In addition, by the step of dissipating the carbon dioxide from the dried egg white, it is possible to decrease the concentration of carbon dioxide in a sealed 250 ml vial to 1% or less, when 25 g of the improved dried egg white is stored in the vial at 75° C. for 24 hours.

The step of dissipating carbon dioxide from the dried egg white may comprise subjecting the dried egg white to a dry-heat treatment while removing the carbon dioxide discharged into the atmosphere from the dried egg white. That is, carbon dioxide in the dried egg white can be dissipated by discharging the carbon dioxide into the atmosphere, and then removing the discharged carbon dioxide from the atmosphere.

To ensure a high amount of carbon dioxide discharge, the temperature of the dry-heat treatment is preferably 45° C. or more, more preferably 50° C. or more, still more preferably 60° C. or more, and particularly preferably 70° C. or more. If the dry-heat treatment temperature is too high, proteins in the dried egg white are denatured before the carbon dioxide is sufficiently discharged from the dried egg white, resulting in insolubilization. For this reason, the dry-heat treatment temperature is preferably 120° C. or less, more preferably 100° C. or less, and still more preferably 90° C. or less.

Accordingly, a preferable temperature range for the dry-heat treatment is 45 to 120° C. The dry-heat treatment at a temperature of 45 to 120° C. ensures efficient discharge of carbon dioxide from the dried egg white, while preventing denaturing of proteins in the dried egg white. A more preferable temperature for the dry-heating is 50 to 120° C., with a still more preferable temperature being 60 to 100° C., and a particularly preferable temperature being 70 to 90° C.

Based on the fact that discharge of carbon dioxide from the dried egg white hardly occurs when the dried egg white are allowed to stand in an atmospheric temperature of about 35° C., but occurs only dry-heated at a temperature above a certain temperature, the carbon dioxide contained in a dried egg white exists in a state combined with a protein in some form.

As mentioned above, whether or not the carbon dioxide in the dried egg white has been dissipated by the dry-heat treatment of the dried egg white at a temperature above a specific temperature can be determined by sampling parts of the dried egg white before and after the dry-heat treatment, measuring the carbon dioxide concentration according to the following method, and comparing the results before and after the dry-heat treatment.

For example, when 25 g of a dried egg white is stored at 75° C. in a sealed 250 ml vial bottle without performing the dry-heat treatment, which is carried out while removing carbon dioxide, the carbon dioxide concentration after 24 hours is about 2 to 4%.

On the other hand, in the method of producing the improved dried egg white according to this embodiment, it is possible to decrease the carbon dioxide concentration in the above-mentioned vial bottle measured in the same manner to 1% or less (preferably 0.8% or less).

The pH of the dried egg white increases usually about 0.01 to 1 by dissipating carbon dioxide by the dry-heat treatment which is carried out while removing the carbon dioxide. Therefore, it is preferable to dissipate carbon dioxide so that the pH of the dried egg white after the dry-heat treatment may become 9.5 or more (preferably 10 or more, and more preferably 10.2 or more). Although the pH of a dried egg white prepared by desugaring without adding an acidic agent such as an organic acid has a pH usually not more than 10.1 (a specific pH differs according to the pH of the liquid egg white and the treating method), according to the invention, it is possible to increase the pH of the dried egg white to 10.2 or more without adding an alkali agent by dissipating carbon dioxide in the dried egg white, In the method for producing the improved dried egg white according to this embodiment, it is possible to improve the gel strength and elasticity by subjecting the dried egg white with a water content of an amount of not lower than a certain level to a dry-heat treatment for a period not less than a certain period of time, simultaneously or after the dry-heat treatment for dissipating carbon dioxide. In this case, in order to more easily achieve the effect of improvement, it is preferable to subject the dried egg white with a water content of 4% or more (more preferably 5% or more) to the dry-heat treatment for one or more days (more preferably two or more days). On the other hand, denaturation easily occurs if the water content is too high or the dry-heat treatment time is too long. Therefore, when carrying out the dry-heat treatment, the water content of the dried egg white is preferably 12% or less, and more preferably 10% or less, and the dry-heat treatment time is preferably not more than 30 days, and more preferably not more than 21 days.

In order to perform such a dry-heat treatment, the water content of the dried egg white at the beginning of the dry-heat treatment is preferably 4 to 12%, and more preferably 5 to 10%. The water content of the dried egg white may decrease during the dry-heat treatment according to the method of the dry-heat treatment which is discussed later. Therefore, when the dry-heat treatment is carried out according to this method of decreasing the water content of the dried egg white, in addition to adjusting the water content of the dried egg white at the start of the dry-heat treatment, it is desirable to carry out the dry-heat treatment for one or more days while preventing vaporization of water from the dried egg white so that the water content of the resulting improved dried egg white finally obtained after the dry-heat treatment may be 3% or more (preferably 4% or more).

In the invention, the water content of the (improved) dried egg white is measured using an infrared moisture meter (FD-600 manufactured by Kett Electric Laboratory).

There are no specific limitations to the method for adjusting the water content of the dried egg white. For example, a method of adjusting the drying conditions when producing the dried egg white and a method of adding water to a dried egg white can be given. When dried with a hot air of 150 to 200° C. which is used under typical spray drying conditions, a dried egg white with a water content of about 6 to 7% is obtained. This dried egg white may be used as it is or after adding water to further adjust the water content.

When the dried egg white is subjected to a dry-heat treatment in the state of the water content of preferably 4% or more, it is difficult to achieve the effect of improvement if the dry-heat treatment temperature is too low. However, since such a dried egg white with an adjusted water content contains a large amount of water which tends to induce denaturation, too high a dry-heat treatment temperature is undesirable. Therefore, the dry-heat treatment temperature when improvement of the gel strength and elasticity is intended is preferably 60 to 90° C., and more preferably 60 to 80° C.

Carbon dioxide discharged from a dried egg white with a pH of 9 or more by the dry-heat treatment at a temperature of 45° C. or more tends to be reabsorbed in the dried egg white in an atmosphere in which the concentration of carbon dioxide is higher than the atmosphere (for example, under the atmosphere after the dry-heat treatment containing the carbon dioxide discharged from the dried egg white), if the atmospheric temperature decreases from the above-mentioned temperature.

For this reason, the dry-heat treatment in the method for producing the improved dried egg white of this embodiment is carried out while removing carbon dioxide. As a method for carrying out a dry-heat treatment while removing carbon dioxide, a method of carrying out such a treatment while removing the carbon dioxide discharged from the dried egg white by ventilation, and a method of carrying out the treatment while causing the carbon dioxide discharged from the dried egg white to be absorbed by an absorbent can be given. The following methods 1 to 3 can be given as specific examples.

The method 1 comprises spreading a dried egg white over a pan to a thickness of 1 mm to 10 cm, and storing the pan in a constant temperature oven, a dryer or a hot storage chamber in which a hot air is circulated for ventilation. According to this method, the carbon dioxide can be dissipated comparatively in a short period of time as compared with the method 2 mentioned later.

In the method 1, the dry-heat treatment temperature must be increased in order to dissipate carbon dioxide from the dried egg white in a short period of time. In this case, the dried egg white is easily denatured before a sufficient amount of carbon dioxide is dissipated. On the other hand, if the amount of the ventilating air is increased, the dried egg white may be blown up in the chamber due to the air flow. Since carbon dioxide is slowly discharged from the dried egg white, too short a dry-heat treatment time may not sufficiently dissipate the carbon dioxide contained in the dried egg white. Therefore, it is preferable to dissipate carbon dioxide from the dried egg white preferably in at least three hours or more, and more preferably in six hours or more, while adjusting the temperature of dry-heat treatment and the amount of ventilation.

The method 2 comprises filling a dried egg white in a container which allows carbon dioxide to permeate and storing the container in a constant temperature oven, a dryer or a hot storage chamber in which a hot air is circulated for ventilation. The method 2 is preferable from the viewpoint of sanitary control. In the method 2, a dried egg white is encapsulated into a pouch made from a polyethylene film with a thickness of 20 to 80 micrometers (preferably 30 to 70 micrometers) and subjected to the dry-heat treatment in a state in which the most portion of the external surface of the pouch is in contact with a heated air which is circulated for ventilation. If the thickness of the pouch is larger than this range, carbon dioxide is not permeated therethrough. On the other hand, if the thickness of the pouch is smaller than this range, the strength is insufficient for efficient processing.

Here, "the most portion of the external surface of the pouch" indicates 70% or more, and preferably 80% or more of the external surface of the pouch.

When two or more pouches in which the dried egg white is enclosed are prepared and subjected to the dry-heat treatment at the same time, it is desirable to dispose these pouches with a certain distance between them in order to ensure easy permeation of carbon dioxide. Specifically, a method of disposing a number of packages, each containing 10 to 20 kg of a dried egg white enclosed therein, on a shelf made of a wire gauze without layering and carrying out a dry-heat treatment in a state in which the most portion of the external surface of the package is in contact with a heated air circulated for ventilation can be given.

Although the method 2 requires a longer time for dissipating carbon dioxide than the method 1, the method 2 can easily maintain the dried egg white in a state of high water content for a longer period of time. Therefore, the method 2 can sufficiently improve elasticity and gel strength by carrying out the dry-heat treatment for one or more days in a state in which the water content of the dried egg white is 4% or more by properly adjusting the water content before the dry-heat treatment as mentioned above.

The method 3 is a method of carrying out a dry-heat treatment while causing carbon dioxide discharged from the dried egg to be absorbed in a carbon dioxide absorber. The method 3 can be used in combination with the method 1 or method 2.

For example, a method of carrying out a dry-heat treatment by enclosing a carbon dioxide absorbent in the same package as the package in which the dried egg white is enclosed, or when the package in which the dried egg white is enclosed has high carbon dioxide permeability, a method of disposing the carbon dioxide absorbent outside the package during the dry-heat treatment can be given.

The larger the amount of the carbon dioxide absorbent used, the faster the adsorption speed of the carbon dioxide dissipated from the dried egg. More specifically, an amount of the carbon dioxide absorbent having an absorption capacity of 2,000 to 6,000 ml per 10 kg of a dried egg white may be used, although a specific amount varies according to the dry-heat treatment temperature and the like.

According to the method 3, carbon dioxide can be selectively removed while maintaining a high water content. Therefore, as in the case of the method 2, the method 3 can sufficiently improve the elasticity and gel strength by properly adjusting the water content before the dry-heat treatment.

3. Characteristics

In order to explain the characteristics of the improved dried egg white of this embodiment and the method for producing the same, a dried egg white described in a published document will be discussed for comparison.

(i) Dried Egg White Described in Japanese Patent No. 2820385

Japanese Patent No. 2820385, for example, discloses a dried egg white of which the gel strength is improved by heat treatment in a hot storage chamber and the like, after adjusting the pH to the alkaline side. When the dried egg white described in this Japanese Patent is used, the higher the pH of the dried egg white to be treated with heat, the better the improvement effect. However, in order to increase the pH, an alkali salt, which remains in the end product and adversely affects the flavor or properties of the products, must be added.

Japanese Patent No. 2820385 further discloses a method of improving the gel strength by a heat treatment of an alkaline dried egg white. Although the higher the pH of the dried egg white to be treated with heat, the better the improvement effect according to this method, it is necessary to add an alkali salt in order to increase the pH. However, the salt may denature and insolubilize proteins during the dry-heat treatment.

(ii) Improved Dried Egg White of this Embodiment and Method for Producing the Same On the other hand, according to the improved dried egg white and the method for producing the same of this embodiment, the dried egg white is improved by increasing the pH by removing carbon dioxide by dry-heat treatment, not by adding an alkali salt. Therefore, the improved dried egg white of this embodiment does not affect the flavor or properties of foodstuffs to which it is added. Furthermore, since proteins are thermally denatured during the dry-heat treatment and can be insolubilized only with difficulty, water retention properties, gel strength, and elasticity are sufficiently improved.

The invention is not limited to the above-described embodiments. Various modifications and variations may be made. For example, the invention includes various other configurations substantially the same as the configurations described in the embodiments (such as a configuration having the same function, method, and results, or a configuration having the same objective and results). The invention also includes a configuration in which an unsubstantial portion in the embodiments is replaced. The invention also includes a configuration having the same effects as the configurations described in the embodiments, or a configuration capable of achieving the same objective as the configurations described in the embodiments. Further, the invention includes a configuration in which a known technique is added to the configurations described in the embodiments.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention.

4. EXAMPLES

The invention is described below in more detail by way of examples. However, the invention is not limited to the following examples.

4.1. Example 1

20 g of baking yeast was added to 10 kg of liquid egg white obtained by cracking eggs and separating the egg white from egg yolk. The mixture was warmed at 35° C. for four hours to desugar. The desugared liquid egg white was dried by spray drying at 170° C. to obtain dried egg white (pH: 10.0, water content: 7%). 1 kg of the dried egg white and a carbon dioxide absorbent (Ageless C-500PS manufactured by Mitsubishi Gas Chemical Co., carbon dioxide absorbing capacity: 500 ml) was filled into an aluminum bag (materials and thicknesses of layers (from the outside to inside): Polyethylene Terephthalate (PET) 12 micrometers, nylon 15 micrometers, aluminum 7 micrometers, and Casted Polypropylene Film (CPP) 70 micrometers). The bag was sealed and placed in a thermostatic chamber at 75° C. for two days to subject the dried egg white to a dry-heat treatment, thereby obtaining the improved dried egg white of Example 1.

4.2. Example 2

2 kg of baking yeast was added to 1,000 kg of liquid egg white obtained by cracking eggs and separating the egg white from egg yolk. The mixture was warmed at 35° C. for four hours to desugar. The desugared liquid egg white was dried by spray drying at 170° C. to obtain dried egg white (pH: 10.0, water content: 7%). The dried egg white was filled into polyethylene bags with a thickness of 60 micrometers, in an amount of 10 kg per each bag. The bags were sealed and placed in a hot storage chamber, in which a hot air was circulated for ventilation at 75° C., for 14 days to subject the dried egg white to a dry-heat treatment, thereby obtaining improved dried egg white of Example 2. When drying, the bags of the dried egg white were arranged on shelves made of metallic mesh in the hot storage chamber, one by one without layering, to cause about 80% of the external surface of each bag to come in contact with hot air in the chamber.

4.3. Example 3

200 g of a 10% citric acid solution and 20 g of baking yeast were added to 10 kg of liquid egg white obtained by cracking eggs and separating the egg white from egg yolk. The mixture was warmed at 35° C. for four hours to desugar. The desugared liquid egg white was dried by spray drying at 170° C. to obtain dried egg white (pH: 9.5, water content: 7%). 1 kg of the dried egg white was filled into a polyethylene bag with a thickness of 60 micrometers. The bag was sealed and placed in a thermostatic chamber of which the internal temperature was kept at 75° C. for 14 days, while circulating a hot air for ventilation at 75° C., for 14 days to subject the dried egg white to a dry-heat treatment, thereby obtaining improved dried egg white of Example 3. When drying, the bag of the dried egg white was allowed to stand in a state in which about 70% of the external surface was caused to come in contact with hot air in the chamber.

4.4. Example 4

20 g of baking yeast was added to 10 kg of liquid egg white obtained by cracking eggs and separating the egg white from egg yolk. The mixture was warmed at 35° C. for four hours to desugar. The desugared liquid egg white was dried by spray drying at 170° C. to obtain dried egg white (pH: 10.0, water content: 7%). The dried egg white was spread over a pan to a thickness of 1 cm, and placed in a drier in which hot air was circulated for ventilation at 75° C. for six hours to obtain the improved dried egg white of Example 4.

4.5. Comparative Example 1

Dried egg white of Comparative Example 1 was obtained in the same manner as in Example 1, except for omitting the dry-heat treatment.

4.6. Comparative Example 2

Dried egg white of Comparative Example 2 was obtained in the same manner as in Example 1, except that the dry-heat treatment was carried out in a thermostatic chamber at 25° C. for seven days.

4.7. Comparative Example 3

Dried egg white of Comparative Example 3 was obtained in the same manner as in Example 1, except that the dry-heat treatment was carried out without putting the carbon dioxide absorbent into the aluminum bag.

4.8. Comparative Example 4

Dried egg white of Comparative Example 4 was obtained in the same manner as in Example 2, except that a polyethylene bag with a thickness of 100 micrometers was used instead of the polyethylene bag with a thickness of 60 micrometers and the bag filled with the dried egg white was sealed and put into a craft bag for dry-heat treatment.

4.9. Comparative Example 5

Dried egg white (pH: 7.2, water content: 7%) was obtained by desugaring and spray-drying liquid egg white in the same manner as in Example 3, except that the amount of the 10% citric acid solution before desugaring was increased to 350 g. The dried egg white was treated with dry hot air in the same manner as in Example 3, except that the treating time was decreased to seven days from 14 days, thereby obtaining the dried egg white of Comparative Example 5.

4.10. Comparative Example 6

20 g of baking yeast was added to 10 kg of liquid egg white obtained by cracking eggs and separating the egg white from egg yolk. The mixture was warmed at 35° C. for four hours to desugar. After the addition of 500 g of a 10% sodium hydroxide solution, the desugared liquid egg white was dried by spray drying at 170° C. to obtain dried egg white (pH: 10.8, water content: 7%). 1 kg of the resulting dried egg white was treated in the same manner as in Example 1, except for omitting the use of the carbon dioxide absorbent. That is, after filling the dried egg white into an aluminum bag and sealing the bag, the dry-heat treatment was carried out in a thermostatic chamber at 75° C. for two days to obtain the dried egg white of Comparative Example 6. The dried egg white of the Comparative Example 6 was denatured.

4.11. Test Example 1-1

In order to verify the measuring method of carbon dioxide concentration, 25 g of the improved dried egg white prepared in Example 2 was put into 250 ml vials, each of which was sealed and allowed to stand at 75° C. for 12 hours or 24 hours before measuring the carbon dioxide concentration therein. In the same manner, 25 g of the improved dried egg white prepared in Comparative Example 4 was put into 250 ml vials. The vials were sealed and allowed to stand at 75° C. for one hour, six hours, 12 hours, 18 hours, or 24 hours before measuring the carbon dioxide concentration therein. The results are shown in Table 1.

As shown in Table 1, although the concentration of carbon dioxide increased as the storing time increased, the concentration became almost constant after 12 hours. It was thus confirmed that a storing time of 24 hours is effective when 25 g of the product is stored and sealed in a 250 ml vial at 75° C., to measure the carbon dioxide concentration in the sealed vital under which the dried egg white is prepared.

TABLE 1

| | Concentration of carbon dioxide after storage | | | | |
|---|---|---|---|---|---|
| | After one hour | After six hours | After 12 hours | After 18 hours | After 24 hours |
| Example 2 | — | — | 0.6 | — | 0.6 |
| Comparative Example 4 | 1.4 | 1.6 | 1.8 | 1.8 | 1.8 |

4.12. Test Example 1-2

In order to verify the measuring method of carbon dioxide concentration, 25 g of the dried egg white prepared in Comparative Example 1 was put into 250 ml vials, each of which was sealed and allowed to stand at 25° C., 35° C., 45° C., 55° C., or 75° C. for 24 hours, and the carbon dioxide concentrations in the vials were measured according to the method mentioned above. The results are shown in Table 2.

It can be understood from the Table shown below that carbon dioxide is not sufficiently discharged if the storing temperature is less than 45° C., but can be sufficiently discharged if the storing temperature is 75° C. It was thus confirmed that a storing temperature of 75° C. is effective when 25 g of the product is stored and sealed in a 250 ml vial for 24 hours, to measure the carbon dioxide concentration in the sealed vital under which the dried egg white is prepared.

TABLE 2

| Temperature of dry-heat treatment (° C.) | 25 | 35 | 45 | 55 | 75 |
|---|---|---|---|---|---|
| Concentration of carbon dioxide (%) | 0.0 | 0.0 | 0.3 | 0.6 | 2.9 |

4.13. Test Example 1-3

In order to verify the measuring method of carbon dioxide concentration, 25 g of the dried egg white prepared in Comparative Example 4 was put into 250 ml vials, each of which was sealed and allowed to stand in a thermostatic chamber at 75° C. for 24 hours, then removed from the thermostatic chamber to a room at 20° C., and the vials were allowed to stand for 20 seconds, 40 seconds, one minute, five minutes, and 10 minutes before measuring the carbon dioxide concentrations therein according to the method mentioned above. The results are shown in the following Table 3.

As shown in the following Table, carbon dioxide was absorbed again in the dried egg white to decrease its concentration in the vials when the vials were allowed to stand in a room at a temperature of 20° C. for one minute, five minutes, or 10 minutes after storing at 75° C. The longer the time in the room at 20° C., the less the carbon dioxide concentration. However, the carbon dioxide concentration was almost constant if the time was not more than one minute. It was thus confirmed that measuring the carbon dioxide concentration within one minute after 25 g of the product is stored and sealed in a 250 ml vial for 24 hours at 75° C. is effective as a method for measuring the carbon dioxide concentration in the sealed vital under which the dried egg white is prepared.

TABLE 3

| Duration | After 20 seconds | After 40 seconds | After one minute | After five minutes | After 10 minutes |
|---|---|---|---|---|---|
| Concentration of carbon dioxide (%) | 1.8 | 1.8 | 1.8 | 1.3 | 0.8 |

4.14. Test Example 2

The pH, carbon dioxide concentration, moisture content, water separation rate, gel strength, and compression distance of the dried egg whites obtained in Examples 1 to 4 and Comparative Examples 1 to 5 were measured by the method described in the above embodiments. The results are shown in Table 4.

It can be understood from the results shown in Table 4 that due to the pH of 9.5 or more and the carbon dioxide concentration of less than 1%, the heat coagulants produced from the improved dried egg whites of Examples 1 to 4 had a water separation rate of 3% or less, indicating excellent water retention properties. In particular, the improved dried egg whites of Examples 1 to 3 obtained by a dry-heat treatment of egg white for one or more days under the conditions of a water content of 4% or more are excellent not only in water retention properties, but also in gel strength and elasticity.

In contrast, it can be understood that, since the dried egg whites of Comparative Examples 1 to 5 have a pH of less than 9 even if the carbon dioxide concentration is 1% or less, or a carbon dioxide concentration of more than 1%, even if the pH is 9 or more, the water separation rate of the heat coagulate is more than 3%, indicating inferior water retention, poor gel strength, and deficient suppleness.

TABLE 4

| | pH | Concentration of carbon dioxide (%) | Water content (%) | Water separation rate (%) | Gel strength (g) | Compression distance (mm) |
|---|---|---|---|---|---|---|
| Example 1 | 10.6 | 0.0 | 7 | 2.7 | 453 | 15.3 |
| Example 2 | 10.4 | 0.6 | 4.5 | 2.5 | 450 | 14.0 |

TABLE 4-continued

|  | pH | Concentration of carbon dioxide (%) | Water content (%) | Water separation rate (%) | Gel strength (g) | Compression distance (mm) |
| --- | --- | --- | --- | --- | --- | --- |
| Example 3 | 9.7 | 0.5 | 4.5 | 3.0 | 400 | 13.0 |
| Example 4 | 10.4 | 0.2 | 2 | 2.8 | 354 | 10.8 |
| Comparative Example 1 | 10.0 | 2.9 | 7 | 3.5 | 200 | 9.1 |
| Comparative Example 2 | 10.0 | 2.9 | 7 | 3.5 | 190 | 9.0 |
| Comparative Example 3 | 10.0 | 3.0 | 7 | 3.3 | 420 | 11.0 |
| Comparative Example 4 | 10.0 | 1.8 | 7 | 3.3 | 420 | 11.0 |
| Comparative Example 5 | 7.0 | 0.1 | 7 | 6.1 | 180 | 6.5 |

4.15. Test Example 3

After measuring the carbon dioxide concentration and the pH in the Test Example 2, the dried egg whites of Example 2 and the Comparative Example 4 were stored at 25° C. in the air for three months, following which the carbon dioxide concentration and the pH were measured according to the same method as in the Test Example 2. The results are shown in Table 5.

As shown in Table 5, in both the dried egg whites of Example 2 and Comparative Example 4, the carbon dioxide concentration was almost the same after storing at 25° C. in the air for three months.

TABLE 5

|  | Before storage | | After storing at 25° C. for three month | |
| --- | --- | --- | --- | --- |
|  | pH | Concentration of carbon dioxide (%) | pH | Concentration of carbon dioxide (%) |
| Example 2 | 10.4 | 0.6 | 10.4 | 0.4 |
| Comparative Example 4 | 10.0 | 1.8 | 10.0 | 1.8 |

4.16. Test Example 4

In this Test Example, the temperature of the dry-heat treatment was studied in the following manner.

2 kg of baking yeast was added to 1,000 kg of liquid egg white obtained by cracking eggs and separating egg yolk to desugar the liquid egg white at 35° C. for four hours. The desugared egg white was dried by spray drying at 170° C. to obtain dried egg white (pH: 10.0, water content: 7%). The dried egg white was packed in polyethylene bags with a thickness of 60 micrometers, each bag containing one kilogram of the dried egg white. The bags were allowed to stand in thermostatic chambers at 25° C., 35° C., 50° C., 60° C., 75° C., or 85° C. in a state in which about 70% of the external surface was in contact with heated air for 10 days while periodically ventilating the thermostatic chambers with heated air. The pH, carbon dioxide concentration, water separation rate, gel strength, and compression distance of the dried egg white in each bag after the dry-heat treatment were measured by the method described in the above embodiments. The results are shown in Table 6.

It can be understood from the Table 6 that carbon dioxide is not sufficiently discharged if the temperature is 35° C. or less, but can be sufficiently discharged if the temperature is 50° C. or more. The dried egg whites after the dry-heat treatment were not denatured in this Test Example.

TABLE 6

| Temperature of dry-heat treatment (° C.) | pH | Concentration of carbon dioxide (%) | Water separation rate (%) | Gel strength (g) | Compression distance (mm) |
| --- | --- | --- | --- | --- | --- |
| 25 | 10.0 | 2.9 | 3.5 | 247 | 9.1 |
| 35 | 10.0 | 2.8 | 3.5 | 264 | 9.5 |
| 50 | 10.1 | 1.9 | 2.7 | 306 | 10.3 |
| 60 | 10.2 | 0.2 | 2.6 | 404 | 13.0 |
| 75 | 10.3 | 0.0 | 2.5 | 444 | 14.0 |
| 85 | 10.3 | 0.0 | 2.5 | 465 | 14.2 |

4.17. Test Example 5

In this Test Example, the period of time of the dry-heat treatment was studied in the following manner. 2 kg of baking yeast was added to 1,000 kg of liquid egg white obtained by cracking eggs and separating egg yolk to desugar the liquid egg white at 35° C. for four hours. The desugared egg white was dried by spray drying at 170° C. to obtain dried egg white (pH: 10.0, water content: 7%). The dried egg white was packed in polyethylene bags with a thickness of 60 micrometers, each bag containing one kilogram of the dried egg white. The bags were allowed to stand in a thermostatic chamber in a state in which about 70% of the external surface was in contact with heated air for zero days, seven days, 14 days, or 21 days while periodically ventilating the thermostatic chamber with heated air. The pH, carbon dioxide concentration, water content, water separation rate, gel strength, and compression distance of the dried egg white in each bag after the dry-heat treatment were measured by the method described in the above embodiments. The results are shown in Table 7.

It can be understood that, as shown in Table 7, the longer the period of dry-heat treatment from 7 days to 14 days and 21 days, the better the extent of improvement in respect of water retention properties, gel strength, and elasticity. The eggs were denatured when the period of dry-heat treatment was more than 30 days.

TABLE 7

| Duration of dry-heat treatment (day) | pH | Concentration of carbon dioxide (%) | Water content (%) | Water separation rate (%) | Gel strength (g) | Compression distance (mm) |
| --- | --- | --- | --- | --- | --- | --- |
| 0 | 10.0 | 2.9 | 7 | 3.5 | 200 | 9.1 |
| 7 | 10.3 | 0.6 | 6 | 2.5 | 420 | 13.0 |
| 14 | 10.5 | 0.6 | 4.5 | 2.5 | 450 | 14.0 |
| 21 | 10.3 | 0.6 | 4.0 | 2.5 | 480 | 14.5 |

4.18. Test Example 6

In this Test Example, the pH of dried egg white before the dry-heat treatment was studied in the following manner.

0 g, 270 g, or 300 g of a 10% citric acid solution and 20 g of baking yeast were added to 10 kg of liquid egg white obtained by cracking eggs and separating the egg white from egg yolk, and the mixtures were warmed at 35° C. for four hours to desugar. The desugared liquid egg whites were dried by spray drying at 170° C. to obtain dried egg whites (water content: 7%). The pH of the resulting dried egg whites was respectively 10.0, 8.5, and 7.4. The pH and carbon dioxide concentration of each dried egg white were measured by the method described in the above embodiments. The results are shown in Table 8.

The dried egg whites were packed in polyethylene bags with a thickness of 60 micrometers, each bag containing one kilogram of the dried egg white. The bags were allowed to stand in a thermostatic chamber in a state in which about 70% of the external surface was in contact with heated air for seven days, while periodically ventilating the thermostatic chamber with heated air at 75° C. The pH, carbon dioxide concentration, water separation rate, gel strength, and compression distance of the dried egg white in each bag after the dry-heat treatment were measured in the same manner. The results are shown in Table 8.

As shown in Table 8, the dried egg white with a pH of 9 or more before the dry-heat treatment has a remarkably higher carbon dioxide concentration than the dried egg white with a pH of less than 9. It was confirmed that the dried egg white with a pH of 9 or more before the dry-heat treatment contains remarkably higher carbon dioxide concentration than the dried egg white with a pH of less than 9. In addition, it can be understood that the dried egg white with a pH of 9 or more before the dry-heat treatment exhibits a significant decrease in the carbon dioxide content and an increase of pH by the dry-heat treatment while removing carbon dioxide, whereas the dried egg white with a pH less than 9 before the dry-heat treatment exhibits almost no change in the carbon dioxide content and pH, even if treated by dry-heat while removing carbon dioxide.

TABLE 8

| Before dry-heat treatment | | After dry-heat treatment | | | | |
| --- | --- | --- | --- | --- | --- | --- |
| pH | Concentration of carbon dioxide (%) | pH | Concentration of carbon dioxide (%) | Water separation rate (%) | Gel strength (g) | Compression distance (mm) |
| 10.0 | 2.9 | 10.4 | 0.6 | 2.5 | 450 | 14.0 |
| 8.5 | 0.8 | 8.3 | 0.1 | 3.8 | 200 | 6.8 |
| 7.4 | 0.4 | 7.3 | 0.0 | 6.1 | 180 | 6.5 |

4.19. Test Example 7

Preparation of Processed Hams

Two types of processed hams to which either the dried egg white obtained in Example 2 or Comparative Example 5 was added were prepared as follows to evaluate the effect of promoting water retention properties. A mixer was charged with 76.96 parts of water, 10 parts of the dried egg white, 4 parts of salt, 4 parts of dextrin, 3 parts of refined sugar, 1 part of phosphate, 0.04 parts of coloring agent, 0.5 parts of a spice, and 0.5 parts of sodium glutamate. The mixture was stirred to become almost homogeneous to obtain a pickle solution. 60 parts of the pickle solution and 100 parts of ground pork were sufficiently mixed in a deaerating mixer, filled in a nylon container with a folding diameter of 60 mm, and heated at 70° C. for 40 minutes to obtain a processed ham.

The processed hams were stored overnight and their water separation rate was measured in the following manner. First, after measuring the whole mass (g), the nylon container was opened, and water attached to the internal surface of the container and the surface of the processed hams was removed by wiping to measure the weight (g) of the container and the weight (g) of the processed hams after removing the water. The water separation rate(%) was calculated according to the following formula.

Water separation rate(%)={Total mass(g)−mass of container(g)−mass of ham(g)}/ {Total mass(g)− mass of container(g)}×100

It can be seen from the results of Table 9 that the processed ham to which the improved dried egg white of Example 2 was added exhibited a smaller water separation rate than the processed ham to which the dried egg white of Comparative Example 5 was added, indicating a more excellent effect of promoting the better water retention properties of the improved dried egg white of Example 2.

TABLE 9

| | Water separation rate (%) |
|---|---|
| Example 2 | 1.8 |
| Comparative Example 5 | 3.5 |

4.20. Test Example 8

Preparation of Chinese Noodles

Two parts of each dried egg white obtained in Examples 1 and 2 and Comparative Examples 1, 3, 4, and 5 were added to 100 parts of wheat flour to prepare Chinese noodles according to a commonly used method. A texture improvement effect of the noodles was evaluated. Specifically, 100 parts of wheat flour (semi-hard flour), 2 parts of salt, 1.5 parts of KANSUI (food additive for Chinese noodle), 2 parts of dried egg white, and 35 parts of water were provided. The wheat flour and the dried egg white were added to a noodle-making mixer to sufficiently mix the powders. Then, a kneading water prepared by dissolving the salt and sea water in the plain water was slowly added while stirring and the mixture was sufficiently kneaded to homogenize to obtain a noodle paste. The noodle paste was rolled to a thickness of 1 mm and cut using a #24 square cutter of the noodle-making machine to obtain Chinese noodles. The noodle was cooked in hot water at 90° C. for 3 minutes and dipped in a soup at 65° C. or more to sensuously evaluate the texture.

The evaluation results in this Test Example were calculated by averaging the scores rated by 20 adults (10 men and 10 women) to each test sample. For the texture evaluation, the noodles were given 3 points, 2 points, 1 point, or zero point in the order of the intensity of imparted elasticity sensation. In Table 10, noodles were indicated as if the average score was 2.5 points or more, as A if the average score was 1.5 points or more, as B if the average score was 0.5 points or more, and as C if the average score was less than 0.5.

It can be seen from the results of Table 10 that the noodles to which the improved dried egg white of Example 1 or 2 was added exhibited a good texture improvement effect. In contrast, the noodles to which the dried egg white of Comparative Example 1, 3, 4, or 5 was added exhibited no texture improvement effect.

TABLE 10

| | Evaluation of texture |
|---|---|
| Example 1 | S |
| Example 2 | S |
| Comparative Example 1 | C |
| Comparative Example 3 | B |
| Comparative Example 4 | B |
| Comparative Example 5 | C |

S: The elasticity is very strong imparting favorable texture.
A: The elasticity is slightly weak, but poses no problem.
B: The elasticity is rather weak.
C: The elasticity is weak.

4.21. Test Example 9

Preparation of Frozen Okonomiyaki (Japanese-Style Pancakes)

Two types of frozen Japanese-style pancakes (Okonomiyaki pancakes) to which either the dried egg white obtained in Example 2 or Comparative Example 5 was added were prepared as follows to evaluate the effect of preventing denaturing during frozen storage. A bowl was charged with 140 parts of dashi (a clear broth soup), 120 parts of wheat flour, 120 parts of liquid whole egg, 4 parts of grated yam, and 4 parts of dried egg white, and the mixture was stirred and mixed using a whisk until no flour lumps are present. Then, 130 parts of shredded cabbage was added and the mixture was further stirred to obtain a dough for Okonomiyaki pancakes. The dough was cooked on a hot plate heated at 200° C. and greased with vegetable oil to prepare Okonomiyaki pancakes. The resulting Okonomiyaki pancakes were packed in polyethylene pouches and quickly frozen to −40° C. to obtain frozen Okonomiyaki pancakes.

The frozen Okonomiyaki pancakes stored at −20° C. for one week were heated in a microwave oven and eaten. The Okonomiyaki pancake to which the dried egg white of Comparative Example 5 was added imparted a gooey sensation due to water discharge therefrom, whereas Okonomiyaki pancake to which the improved dried egg white of Example 2 was added maintained the texture before refrigeration without imparting a gooey sensation due to prevention of water discharge therefrom.

4.22. Test Example 10

Preparation of Frozen Cream Croquettes

Two types of frozen cream croquettes to which either the dried egg white obtained in Example 2 or Comparative Example 5 was added were prepared as follows to evaluate the effect of preventing denaturing during frozen storage. A cooker equipped with a stirrer was charged with 78.5 parts of milk, 10 parts of wheat flour, 10 parts of butter, 1 part of the dried egg white, and 0.5 parts of salt, and the mixture was heated while stirring to obtain a filling for cream croquettes. The filling was divided into 25 g pieces and quickly frozen to −40° C. The frozen pieces were coated with batter and crumbs before melting and frozen again quickly to −40° C. to obtain frozen cream croquettes.

The frozen cream croquettes stored at −20° C. for one week were deep-fried at 165° C. for five minutes and eaten. Compared with the cream croquettes to which the dried egg white of Comparative Example 5 was added, the cream croquettes to which the improved dried egg white of Example 2 was added maintained the smooth texture which was possessed by the croquettes before refrigeration.

4.23. Test Example 11

Preparation of Frozen Gratins

Two types of frozen gratin to which either the dried egg white obtained in Example 2 or Comparative Example 5 was added were prepared as follows to evaluate the effect of preventing denaturing during frozen storage. A cooker equipped with a stirrer was charged with 78.5 parts of milk, 10 parts of wheat flour, 10 parts of butter, 1 part of the dried egg white, and 0.5 parts of salt, and the mixture was heated while stirring to obtain a white sauce. 250 g of the white sauce was mixed with 100 g of macaroni, poured into a heat-resistant dish, topped with grated cheese, and baked at 190° C. for four minutes to obtain gratins. The resulting gratins were quickly frozen to −40° C. to obtain frozen gratins.

The frozen gratins stored at −20° C. for one week were heated in a microwave oven and eaten. Compared with the gratin to which the dried egg white of Comparative Example 5 was added, the gratin to which the improved dried egg white of Example 2 was added maintained the smooth texture that was possessed by the gratins before refrigeration.

4.24. Test Example 12

Preparation of Frozen Shumai (Steam Dumplings)

Two types of frozen shumai to which either the dried egg white obtained in Example 2 or Comparative Example 5 was added were prepared as follows to evaluate the effect of preventing denaturing during frozen storage. A deaerating mixer was charged with 1,000 parts of ground pork, 20 parts of the dried egg white, 20 parts of sake, 16 parts of sesame oil, 12 parts of salt, 6 parts of sugar, and 140 parts of water. The mixture was mixed to obtain a filling for shumai. The filling was wrapped with shumai wrapper and steamed to obtain shumai. The resulting shumai were quickly frozen to −40° C. to obtain frozen shumai.

The frozen shumais stored at −20° C. for one week were heated in a microwave oven and eaten. The shumai to which the dried egg white of Comparative Example 5 was added a rough texture, whereas the shumai to which the improved dried egg white of Example 2 was added maintained the smooth texture that was possessed by the shumai before refrigeration.

4.25. Test Example 13

Preparation of Frozen Omelets

Two types of frozen omelets to which either the dried egg white obtained in Example 2 or Comparative Example 5 was added were prepared as follows to evaluate the effect of preventing denaturing during frozen storage. A mixer was charged with 70 parts of liquid whole egg, 8 parts of sugar, 9 parts of starch, 3 parts of the dried egg white, 0.3 parts of salt, 1 part of sweet sake, 1 part of soy sauce, and 22 parts of dashi (a clear broth soup), and the mixture was stirred to obtain an egg mixture. The mixture was then baked in a pan to obtain omelets. The resulting omelets were quickly frozen to −40° C. to obtain frozen omelets, packed in polyethylene pouches, and stored in a freezer at −20° C.

The frozen omelets were stored for one month and their water separation rate was measured in the following manner. The frozen omelets in polyethylene pouches were taken out of the freezer and defrosted at room temperature of 20° C. No water separation was observed inside of either pouch at this stage. The omelets were cut into rectangular parallelepipeds with a length of 3 cm, a width of 9 cm, and a height of 2 cm, and their mass (A) was measured. A rectangular parallelepiped with a height of 2 cm was placed on a two-ply filter paper, and another two-ply filter paper was placed on top of the rectangular parallelepiped. A 200 g weight which is larger than the bottom of the cut omelet (3×9 cm) was placed evenly on the cut omelet for 30 minutes, and its mass (B) was measured. The water separation rate (%) was calculated by the following formula using the measured values.

Water separation rate(%)={(A(g)−B(g))/A(g)}×100

It can be seen from the results of Table 11 that the frozen omelet to which the improved dried egg white of Example 2 was added exhibited a smaller water separation rate than the frozen omelet to which the dried egg white of Comparative Example 5 was added, indicating a more excellent effect of preventing denaturing during frozen storage of the improved dried egg white of Example 2.

TABLE 11

| | Water separation rate (%) |
|---|---|
| Example 2 | 5.0 |
| Comparative Example 5 | 7.2 |

4.26. Test Example 14

Preparation of Chawan-Mushi (Japanese Egg Custard Dish)

A chawan-mushi to which the dried egg white obtained in Example 2 was added was prepared as follows to evaluate the effect of preventing water separation. A mixer was charged with 25 parts of liquid whole egg, 2 parts of starch, 2 parts of the dried egg white, 1 part of soy sauce, 0.3 parts of salt, and 70 parts of dashi (a clear broth soup), and the mixture was stirred to obtain an egg mixture. A heat-resistant resinous container was filled with the egg mixture and steamed at 85° C. for 40 minutes using a steamer to obtain a chawan-mushi. A chawan-mushi without dried egg white was prepared in the same manner as a comparison.

The resulting chawan-mushi were stored at 5° C. for three days, and water separation of their surfaces was evaluated. The water separation was prevented on the surface of the chawan-mushi to which the improved dried egg white of Example 2 was added when compared with the chawan-mushi without dried egg white.

4.27. Test Example 15

Preparation of Fish-Meat Sausages

A fish-meat sausage to which the dried egg white obtained in Example 2 was added was prepared as follows to evaluate the effect of improved texture. As a comparison, a fish-meat sausage without dried egg white was prepared. A masher grinder was charged with 500 g of frozen surimi, 15 parts of salt, 90 parts of starch, 50 parts of lard, 8 parts of sugar, 5 parts of sodium glutamate, 2.5 parts of a spice, 1 part of a food color, and 230 parts of water. The mixture was mixed, deaerated, filled into a nylon container with a folding diameter of 48 mm, and heated at 120° C. for 20 minutes to obtain a fish meat sausage. Another fish meat sausage as prepared in the same manner except that 20% of the frozen surimi was replaced with a rehydrated solution of dried egg white obtained in Example 2 (prepared by adding 7 parts of water to 1 part of the dried egg white).

These fish meat sausages were stored for one day and their gel strength and compression distance were measured. It can be seen from the results of Table 12 that the fish meat sausage to which the improved dried egg white of Example 2 was added exhibited a higher gel strength and longer compression distance than the fish meat sausage without improved dried egg white, indicating an improved texture of the improved dried egg white of Example 2.

Note that the gel strength and compression distance were measured using FUDOH RHEO METER NRM-2010J-CW (manufactured by Rheotech) and a 5 mm phi spherical plunger at a table elevation speed of 6 cm/min.

TABLE 12

|  | Gel strength (g) | Compression distance (mm) |
|---|---|---|
| Example 2 | 348 | 6.5 |
| Comparison | 326 | 6.2 |

4.28. Test Example 16

Preparation of Kamaboko (Surimi)

Two types of kamaboko to which either the dried egg white obtained in Example 2 or Comparative Example 5 was added were prepared as follows to evaluate a texture improvement effect. 800 g of frozen surimi was mashed in a masher grinder. Then, 30 parts of salt, 70 parts of starch, 25 parts of the dried egg white, 10 parts of sugar, 10 parts of sodium glutamate, 40 parts of sweet sake, and 775 parts of water were added in this order, and mixed. The mixture was deaerated, filled into a nylon container with a folding diameter of 60 mm, and heated at 90° C. for 30 minutes to obtain kamaboko.

These kamaboko were stored for one day at 10° C. and their gel strength was measured. It can be seen from the results of Table 13 that the kamaboko to which the improved dried egg white of Example 2 was added exhibited a higher gel strength than the kamoboko to which the dried egg white of Comparative Example 5 was added, indicating an improved texture of the improved dried egg white of Example 2.

Note that the gel strength was measured in the same manner as in Test Example 15.

TABLE 13

|  | Gel strength (g) |
|---|---|
| Example 2 | 119 |
| Comparative Example 5 | 110 |

What is claimed is:

1. A method for producing an improved dried egg white, the method comprising:
    drying a liquid egg white to obtain a dried egg white, the dried egg white having a first pH of 9 or more; and
    dissipating carbon dioxide from the dried egg white by subjecting the dried egg white to a dry-heat treatment while removing carbon dioxide from the dried egg white into the atmosphere, the dissipating carbon dioxide from the dried egg white increasing the first pH of the dried egg white 0.01 to 1 units to obtain a second pH of at least 9.5,
    wherein the carbon dioxide concentration of the improved dried egg white is 1% or less in a sealed 250 ml vial, when 25 g of the improved dried egg white is stored in the vial at 75° C. for 24 hours.

2. The method for producing an improved dried egg white according to claim 1, wherein the dry-heat treatment temperature is 45 to 120° C.

3. The method for producing an improved dried egg white according to claim 1, wherein the dry-heat treatment is carried out while removing carbon dioxide discharged from the dried egg white by ventilation.

4. The method for producing an improved dried egg white according to claim 1, wherein the dry-heat treatment is carried out while absorbing carbon dioxide discharged from the dried egg by a carbon dioxide absorber.

5. The method for producing an improved dried egg white according to claim 1,
    wherein the dry-heat treatment is carried out for one or more days under conditions in which the water content of the dried egg white is 4% or more.

6. The method for producing an improved dried egg white according to claim 1,
    wherein the pH of the dried egg white is 10 or more after the carbon dioxide contained in the dried egg white has been dissipated.

* * * * *